United States Patent
Otsu et al.

(10) Patent No.: US 11,642,663 B2
(45) Date of Patent: May 9, 2023

(54) MOLYBDENUM SULFIDE, METHOD FOR PRODUCING SAME, AND HYDROGEN GENERATION CATALYST

(71) Applicant: DIC Corporation, Tokyo (JP)

(72) Inventors: Masato Otsu, Sakura (JP); Jian-Jun Yuan, Sakura (JP); Minoru Tabuchi, Sakura (JP); Kaori Kawamura, Sakura (JP); Naoto Sakurai, Sakura (JP); Koichiro Matsuki, Sakura (JP); Yuichi Satokawa, Sakura (JP)

(73) Assignee: DIC Corporation, Tokyo (JP)

( * ) Notice: Subject to any disclaimer, the term of this patent is extended or adjusted under 35 U.S.C. 154(b) by 123 days.

(21) Appl. No.: 17/024,779

(22) Filed: Sep. 18, 2020

(65) Prior Publication Data
US 2021/0053037 A1 Feb. 25, 2021

Related U.S. Application Data (63) Continuation-in-part of application No. PCT/JP2019/010516, filed on Mar. 14, 2019.

(30) Foreign Application Priority Data

Mar. 19, 2018 (JP) .............................. JP2018-051035

(51) Int. Cl.
*B01J 27/00* (2006.01)
*B01J 27/051* (2006.01)
(Continued)

(52) U.S. Cl.
CPC ........... *B01J 27/051* (2013.01); *B01J 35/004* (2013.01); *B01J 35/0013* (2013.01);
(Continued)

(58) Field of Classification Search
None
See application file for complete search history.

(56) References Cited

U.S. PATENT DOCUMENTS 6,451,729 B1 * 9/2002 Song ..................... B01J 27/051
423/511
2004/0018306 A1 1/2004 Tenne et al.
(Continued)

FOREIGN PATENT DOCUMENTS

CN 105797698 A * 7/2016
CN 106207185 B * 4/2017 .............. H01M 4/62
(Continued)

OTHER PUBLICATIONS

CN-106207185-A—English translation (Year: 2016).*
(Continued)

*Primary Examiner* — Stefanie J Cohen
(74) *Attorney, Agent, or Firm* — Locke Lord LLP; James E. Armstrong, IV; Nicholas J. DiCeglie, Jr.

(57) ABSTRACT

Provided is a molybdenum sulfide that is ribbon-shaped and particularly suitable for a hydrogen generation catalyst. Disclosed are a ribbon-shaped molybdenum sulfide, in which 50 particles as measured by observation with a scanning electron microscope (SEM) have a shape of, on average, 500 to 10000 nm in length, 10 to 1000 nm in width, and 3 to 200 nm in thickness; a method for producing the ribbon-shaped molybdenum sulfide, including: (1) heating a molybdenum oxide at a temperature of 200 to 1000° C. in the presence of a sulfur source; or (2) heating a molybdenum oxide at a temperature of 100 to 800° C. in the absence of a sulfur source, and then heating the molybdenum oxide at a temperature of 200 to 1000° C. in the presence of a sulfur source; and a hydrogen generation catalyst including the ribbon-shaped molybdenum sulfide.

6 Claims, 2 Drawing Sheets

(51) Int. Cl.
  *B01J 35/00* (2006.01)
  *B01J 35/10* (2006.01)
  *B01J 37/20* (2006.01)
  *C01B 3/04* (2006.01)
  *C01G 39/06* (2006.01)

(52) U.S. Cl.
  CPC ........... *B01J 35/1014* (2013.01); *B01J 37/20* (2013.01); *C01B 3/042* (2013.01); *C01G 39/06* (2013.01); *C01P 2002/72* (2013.01); *C01P 2002/80* (2013.01); *C01P 2004/03* (2013.01); *C01P 2004/04* (2013.01); *C01P 2004/30* (2013.01); *C01P 2004/61* (2013.01); *C01P 2004/62* (2013.01); *C01P 2004/64* (2013.01); *C01P 2006/12* (2013.01)

(56) References Cited

U.S. PATENT DOCUMENTS

| | | | |
|---|---|---|---|
| 2006/0120947 A1 | 6/2006 | Tenne et al. | |
| 2014/0212587 A1* | 7/2014 | Malshe | C10M 169/042 106/18.32 |
| 2015/0158017 A1 | 6/2015 | Fecant et al. | |

FOREIGN PATENT DOCUMENTS

| | | |
|---|---|---|
| CN | 106830082 A | 6/2017 |
| JP | 2004-512250 A | 4/2004 |
| JP | 2004-277199 A | 10/2004 |
| JP | 2015-142882 A | 8/2015 |
| JP | 2015-531731 A | 11/2015 |

OTHER PUBLICATIONS

Bragado et al, self assembly of molybdite nanoribbons, appl. phys., A 82, pp. 19-22 (Year: 2006).*
Xu et al., Metallic and ferromagnetic MoS2 nanobelts with vertically aligned edges, nano research, 8(9), pp. 2946-2953 (Year: 2015).*
CN-105797698-A—English translation (Year: 2016).*
B. Pourabbas et al., "Preparation of MoS nanoparticles by a modified hydrothermal method and the photo-catalytic activity of MoS2/TiO2 hybrids in photo-oxidation of phenol," Chemical Engineering Journal 138, 2008, pp. 55-62. (cited in the Nov. 26, 2021 Search Report issued for EP19770579.1).
G.A. Camacho-Bragado et al., "Self-assembly of molybdite nanoribbons," Applied Physics A, vol. 82, 2006, pp. 19-22. (cited in the Nov. 26, 2021 Search Report issued for EP19770579.1).
Supplementary European Search Report dated Nov. 26, 2021, issued for European Patent Application No. 19770579.1.
Albiter, M. A. et al., "Synthesis of MoS2 nanorods and their catalytic test in the HDS of dibenzothiophene," Nanotechnology, Jun. 2, 2006, vol. 17, pp. 3473-3481. (cited in the ISR).
Xu, Guanchen et al., "Metallic and Ferromagnetic MoS2 Nanobelts with Vertically Aligned Edges," Nano Research, Sep. 2015, vol. 8, Issue 9, pp. 2946-2953, Electronic Supplementary Material, pp. 1-5. (cited in the ISR).
International Search Report dated May 28, 2019, issued for PCT/JP2019/010516.
Jie Ma, "REVO4, REBO3 and REPO4 (Re = Rare earth element) Nanomaterials Constructed via Solid Phase Hydrothermal Route and Their Fluorescence Properties", Tongji University, Department of Chemistry, pp. 4-5 (2008).
Notice of Reasons for Refusal issued in Chinese Patent Application No. CN 201980017994.9, dated Apr. 25, 2022.

* cited by examiner

MOLYBDENUM SULFIDE, METHOD FOR PRODUCING SAME, AND HYDROGEN GENERATION CATALYST

TECHNICAL FIELD

The present invention relates to molybdenum sulfide, a method for producing the same, and a hydrogen generation catalyst.

BACKGROUND ART

Molybdenum sulfides represented by molybdenum disulfide ($MoS_2$) are well known as, for example, lubricants, steel additives, and molybdate raw materials. These molybdenum sulfides have been used in applications that effectively utilize the advantage of being inert.

However, in recent years, application to fine applications such as semiconductor materials and catalysts has begun to be attempted by paying attention to their activity. Such an activity can be enhanced to some extent by pulverizing molybdenum sulfide or releasing the aggregation of molybdenum sulfide, which is obtained by an arbitrary production method such as sulfurization of a molybdenum oxide, but in many cases, excellent performance as expected cannot be obtained only by this method. Therefore, methods for producing molybdenum sulfides having unique shapes such as a monolayer shape, a nanoflower shape, and a fullerene-like shape have been studied in order to exhibit more excellent performance in accordance with each intended use (see PTL 1 and PTL 2).

CITATION LIST

Patent Literature

PTL 1: JP-A-2004-277199
PTL 2: JP-A-2004-512250

SUMMARY OF INVENTION

Technical Problem

In order to obtain a molybdenum sulfide having a new shape which has not been known so far and a shape capable of exhibiting more excellent performance particularly when used as a catalyst among various uses, various production methods have been studied by tracing known literatures and trial and error, but all production methods for obtaining a unique shape are complicated and it has been difficult to obtain such a shape. It is assumed that there is a manufacturing know-how which is not described in the known literature. On the other hand, in the case of the experiment in which the tracing of the publicly known literature was successful, although molybdenum sulfide in the form of pulverized fine particles was obtained at a glance on the electron microscope photograph, the aggregation was actually severe and the expected catalytic performance was not obtained. In many cases, the intensity of aggregation cannot be determined only from the two-dimensional image of an electron microscope.

The present invention has been made in view of the above circumstances, and an object of the present invention is to provide a novel shape and structure which has not been known so far, specifically, a ribbon-shaped molybdenum sulfide, a simple method for producing the same, and a hydrogen generation catalyst containing the ribbon-shaped molybdenum sulfide.

Solution to Problem

As a result of intensive studies to solve the above problems, the present inventors have found that the above problems can be solved and completed the present invention. That is, the molybdenum sulfide, the method for producing the same, and the hydrogen generation catalyst of the present invention have the following features.

1. A ribbon-shaped molybdenum sulfide, wherein 50 particles as measured by observation with a scanning electron microscope (SEM) have a shape of, on average, 500 to 10000 nm in length, 10 to 1000 nm in width, and 3 to 200 nm in thickness.
2. A method for producing the ribbon-shaped molybdenum sulfide described in 1 above, including:
   (1) heating a molybdenum oxide at a temperature of 200 to 1000° C. in the presence of a sulfur source; or
   (2) heating a molybdenum oxide at a temperature of 100 to 800° C. in the absence of a sulfur source, and then heating the molybdenum oxide at a temperature of 200 to 1000° C. in the presence of a sulfur source.
3. A hydrogen generation catalyst containing the molybdenum sulfide described in 1 above.

Advantageous Effects of Invention

According to the present invention, a particularly remarkable effect is achieved, namely, it is possible to provide a ribbon-shaped molybdenum sulfide having a unique shape different from conventional ones, a simple method for producing the same, and a hydrogen generation catalyst having higher activity than conventional ones.

DESCRIPTION OF EMBODIMENTS

Molybdenum sulfide of the present invention is characterized in that the three-dimensional shape thereof is unique, which is not conventional and 50 particles as measured by observation with a scanning electron microscope (SEM) have a ribbon shape of, on average, 500 to 10000 nm in length, 10 to 1000 nm in width, and 3 to 200 nm in thickness.

(Shape)

The molybdenum sulfide in the present invention has a ribbon shape. The length, width, and thickness of the molybdenum sulfide can be measured by observation with a scanning electron microscope (SEM) or an image photograph thereof. The SEM is characterized in that the scanning of the electron beam is linear, but by sequentially shifting the scanning axis, mainly the shape of the molybdenum sulfide can be observed finely. The magnification of the SEM may be a magnification such that at least 50 particles of molybdenum sulfide are contained in one visual field in visual observation or an image photograph, it is preferable to select an appropriate magnification from the range of 1000 to 200000 times based on the range of length, width, and thickness on average, which will be described later.

In the present invention, the shape of 50 particles of molybdenum sulfide in the SEM image needs to look like a ribbon shape by visual observation or an average of image photographs. The term "ribbon shape" means a hexahedron having a shape obtained by cutting a long roll having a certain width (horizontal) and a length (vertical) larger than the width (horizontal) by a predetermined length (vertical) in the width (horizontal) direction, and a shape in which the thickness corresponding to the depth direction in the cut cross section does not exceed the width (horizontal).

In addition, since molybdenum sulfide is an aggregate of ribbon-shaped hexahedrons and it is difficult to selectively obtain only molybdenum sulfide having only one length, only one width, and only one thickness, and from a statistical point of view, it is necessary for the molybdenum sulfide to have the shape of 50 particles of, on average, 500 to 10000 nm in length, 10 to 1000 nm in width, and 3 to 200 nm in thickness, preferably 900 to 5000 nm in length, 30 to 500 nm in width, and 3 to 20 nm in thickness.

The greatest feature of the molybdenum sulfide of the present invention is that it is a ribbon-shaped hexahedron having the above-described specific length, width and thickness range, and the surface and internal structure itself are not particularly limited. Specifically, examples of the structure include a structure having a medium-dense and smooth surface, a surface structure having medium-dense and crater-like depressions, and a structure having pore inlets on the surface toward the inside of the surface and having independent pores and/or pores communicating with other surfaces in the inside. In the case of a porous structure having a large number of communicating pores, it is often possible to effectively exhibit a unique function based on the structure.

(Structure)

Within the range of the above-described shape, molybdenum sulfide can be appropriately selected and used on the basis of the surface or internal structure depending on the use of the molybdenum sulfide. For example, when molybdenum sulfide itself is used as a catalyst, it is effective to increase the contact area with the molecules of the reaction raw material as much as possible in order to more effectively progress the intended chemical reaction. The molybdenum sulfide having a structure, for example, a porous structure, as described above, in which the surface has pore inlets directed toward the inside of the surface and the inside has independent pores and/or pores communicating with other surfaces, can exhibit catalytic activity as compared with that having a medium-dense structure. The size and degree of the pores inside the hexahedron of molybdenum sulfide can be appropriately measured by a known and commonly used method corresponding to each of micropores, mesopores, and macropores. Specific examples of the measurement method include Japanese Industrial Standard (JIS) Z8831, which is a measurement method for the pore size distribution and pore characteristics of powder (solid) by a mercury-intrusion method, for the pore distribution and pore volume centered on mesopores and macropores, and Japanese Industrial Standard (JIS) Z8830, which is a measurement method for the BET specific surface area by a nitrogen gas adsorption method, for the surface size inside pores centered on micropores. Of course, if necessary, these methods may be combined for measurement.

The function of molybdenum sulfide as a catalyst may be evaluated by the number of the above-described micropores, which are smaller than mesopores and macropores. When the molybdenum sulfide of the present invention is used as a catalyst, the specific surface area as measured by the BET method is preferably 15 to 100 $m^2/g$ from the viewpoint of more excellent catalytic activity, and more preferably 20 to 100 $m^2/g$, still more preferably 25 to 100 $m^2/g$, and most preferably 35 to 100 $m^2/g$.

(Composition)

In the present invention, molybdenum sulfide is a generic term for a compound composed of a molybdenum atom and a sulfur atom. Examples of such a molybdenum sulfide include those represented by MoSx (x=1 to 3). The MoSx can be adjusted, for example, according to the charge molar ratio in the reaction between a molybdenum source such as molybdenum trioxide ($MoO_3$) and a sulfur source. By adjusting the charge molar ratio of the molybdenum source to the sulfur source, MoSx containing molybdenum disulfide ($MoS_2$) as an essential component and also containing other molybdenum sulfides can be obtained. Specifically, examples of the molybdenum sulfide include molybdenum disulfide only, molybdenum trisulfide only, and a mixture thereof.

The fact that the product obtained by the production method of the present invention described later is molybdenum sulfide can be identified by a known and commonly used analysis method, for example, elemental analysis or atomic absorption spectrometry (AAS). In the case where the molybdenum sulfide is not composed of only one substance having a single composition, the composition of MoSx is preferably identified based on measurement by high frequency inductively coupled plasma (ICP) emission spectral analysis method.

Atoms other than the molybdenum atom and the sulfur atom may be included in the molybdenum sulfide as long as the effects of the present invention are not impaired. Specific examples thereof include silicon, aluminum, sodium, iron, titanium, potassium, calcium, and yttrium. These other atoms may be contained alone or in combination of two or more kinds thereof.

The content of the other atoms in the molybdenum sulfide is preferably 10 mol % or less, more preferably 5 mol % or less, and most preferably 2 mol % or less.

(Production Method)

The above-described specific molybdenum sulfide of the present invention may be obtained by any production method, and examples thereof include arbitrary production methods such as a two-stage reaction in which hydrogen and hydrogen sulfide are reacted with each other via an intermediate of molybdenum dioxide to produce water, a one-stage reaction in which molybdenum trioxide and sulfur itself are reacted to produce sulfur dioxide, and a two-stage reaction in which sulfur is reacted via an intermediate of molybdenum dioxide to produce sulfur dioxide.

In carrying out the production method of the present invention, it is preferable to use, for example, a heat-resistant container such as a crucible so that the reaction at a high temperature can be smoothly carried out. In addition, it is preferable to carry out the above-described reaction in the absence of a substance capable of reacting with molybdenum oxide or sulfur, for example, in the absence of oxygen gas, for example, in an inert gas atmosphere such as nitrogen gas or a rare gas such as helium or argon. Since the reaction is accompanied by the generation of water vapor, sulfur oxide gas and the like, the reaction is preferably carried out under atmospheric pressure rather than under pressure.

The molybdenum sulfide of the present invention can be obtained by optimization of these reactions. In view of the reaction formula, sulfur oxide is released from the reaction system, and only molybdenum sulfide remains in the system as a product. Since sulfur oxide can be easily supplemented with an alkali or the like without being released to the atmosphere, the molybdenum sulfide of the present invention is preferably produced by a one-stage reaction according to the formula (3).

[Math. 1]

$$MoO_3+xH_2 \rightarrow MoO_{3-x}+xH_2O \quad (1)$$

$$MoO_{3-x}+(1-x)H_2+2H_2S \rightarrow MoS_2+(3-x)H_2O \quad (2)$$

[Math. 2]

$$2MoO_3+7S \rightarrow 2MoS_2+3SO_2 \quad (3)$$

[Math. 3]

$$MoO_3+x/2S \rightarrow MoO_{3-x}+x/2SO_2 \quad (4)$$

$$MoO_{3-x}+(7-x)/2S \rightarrow MoS_2+(3-x)/2SO_2 \quad (5)$$

In particular, since a molybdenum sulfide having the above-described unique shape peculiar to the present invention can be obtained relatively easily, it is preferable in the present invention to use a molybdenum oxide, particularly a molybdenum oxide containing MoO₃ as a main component, which is easily available and inexpensive, and to adopt either of two production methods including: (1) heating a molybdenum oxide at a temperature of 200 to 1000° C. in the presence of a sulfur source (first production method); or (2) heating a molybdenum oxide at a temperature of 100 to 800° C. in the absence of a sulfur source (first step), and then heating the molybdenum oxide at a temperature of 200 to 1000° C. in the presence of a sulfur source (second step) (second production method).

(Raw Material)

In each of the first and second production methods, the molybdenum oxide and the sulfur source are commonly used as raw materials.

Examples of the molybdenum oxide include molybdenum dioxide and molybdenum trioxide, which may be used alone or in combination of two kinds. Examples of the sulfur source include sulfur and hydrogen sulfide, which may be used alone or in combination of two kinds. Sulfur may be used in the form of a solid or a liquid or gas at a high temperature in the reaction. The molybdenum oxide may be used in the form of a solid or a liquid or gas at a high temperature in the reaction.

The purity of each of these raw materials is preferably as high as possible, because molybdenum sulfide can be obtained quantitatively according to the stoichiometry by determining the appropriate number of moles used, and molybdenum sulfide of high purity can be obtained with a smaller content of by-products.

However, when molybdenum trioxide is used as a fusing agent to produce inorganic fillers such as alumina, spinel, and other metal composite oxides and particles of precious stones such as ruby, sapphire, and red spinel by a high-temperature flux method, a gas containing molybdenum trioxide as a main component evaporates from the reaction system in the course of the flux method, and thus the vapor can be recovered and reused in the production of the molybdenum sulfide of the present invention in the form of a gas or liquid or in the form of a solid by cooling if necessary. According to such a method, the production of the above-described inorganic filler and precious stone and the production of molybdenum sulfide useful as a catalyst, for example, can be carried out in parallel, and equipment for recovering molybdenum oxide, which is required in the production of only the former, becomes unnecessary, and the productivity of both can be remarkably enhanced while suppressing the environmental load, equipment cost and installation space, as compared with the case of producing them separately and independently.

The molybdenum oxides used in the production of the molybdenum sulfide of the present invention may have any properties, but when they are used as a solid raw material in the above reaction, they are preferably molybdenum oxides having an average primary particle diameter of 5 to 1000 nm, particularly 5 to 500 nm, in 50 particles in the visual field of the two-dimensional image of a transmission electron microscope (TEM) photograph, because not only a more efficient reaction can be carried out, but also the molybdenum sulfide having the above-described peculiar and unique shape of the present invention can be more easily obtained. The magnification of the TEM may be a magnification such that at least 50 particles of molybdenum oxide are contained in one visual field in visual observation or an image photograph, it is preferable to select an appropriate magnification from the range of 1000 to 200000 times based on the range of length, width, and thickness on average, which will be described later. An SEM may be used instead of the TEM.

As the molybdenum oxide having the above-described specific average primary particle diameter range, any known and commonly used commercially available product can be used, but even if a molybdenum oxide which has a larger average primary particle diameter and is a relatively inexpensive commercially available solid at a room temperature is heated and vaporized and the obtained molybdenum oxide gas is rapidly cooled, a molybdenum oxide powder having the above-described specific average primary particle diameter range and being an excellent raw material for obtaining the molybdenum sulfide of the ribbon-shaped hexahedron of the present invention can be easily obtained. In general, it is considered that the molybdenum oxide having the above-described specific average primary particle diameter range is obtained by pulverizing a molybdenum oxide having a larger particle diameter in a solid state. However, it is difficult to obtain a molybdenum oxide having a sufficiently small average particle diameter by such pulverization, and the use of such a raw material is not preferable as a raw material of such a molybdenum oxide because various reactions for obtaining molybdenum sulfide described later do not proceed efficiently.

The powder of molybdenum oxide, which is a preferable raw material as described above, can be obtained by bringing the molybdenum oxide gas in a molecular state into contact with a large amount of refrigerant, which is greatly excessive compared to the amount of the molybdenum oxide gas, to cool the molybdenum oxide gas. This principle itself is well known and can be realized by a known and commonly used device. If the amount of the molybdenum oxide gas is extremely small, the molybdenum oxide gas is diluted by the refrigerant by bringing the molybdenum oxide gas into contact with the refrigerant in a large excess amount compared to the amount of the molybdenum oxide gas, and the molybdenum oxide will be cooled with a phase change from gas to solid in a very short time. The larger the amount of the refrigerant than the amount of the molybdenum oxide in the form of a gas, the closer the state approaches an infinite dilution state and rapid cooling becomes possible. Cooling can be performed by introducing a large amount of the refrigerant from the outside (outside the system) into the system all at once, or intermittently or continuously by dividing the large amount of the refrigerant or the like.

Of course, when the pressure in the system is reduced due to the above-described phase change, cooling may be performed while maintaining the pressure in an equilibrium state by continuously introducing the refrigerant from the outside, or cooling may be performed by pressurizing the refrigerant and introducing it into the system without maintaining the equilibrium state of the pressure in the system.

As the refrigerant, any known and commonly used refrigerant which does not react at the temperature at the time of contact with the molybdenum oxide gas can be used. Specific examples of the refrigerant include inert gases such as helium and argon, nitrogen, and air. It is preferable to use air, which is excellent in cooling efficiency and inexpensive.

The cooling rate of the molybdenum oxide gas is not particularly limited, but is preferably 100 to 100000° C./sec, and more preferably 1000 to 5000° C./sec. The use ratio of the molybdenum oxide and the refrigerant is determined so as to achieve such a cooling rate. As the cooling rate of the molybdenum oxide gas increases, a powder having a smaller particle diameter and a larger specific surface area tends to be obtained.

The above-described first production method is a production method in which molybdenum oxide is heated at a temperature of 200 to 1000° C. in the presence of a sulfur source, and is, for example, a production method in which crystal growth is directly performed from the above-described particulate molybdenum oxide to obtain a molybdenum sulfide of a ribbon-shaped hexahedron having a peculiar and unique shape to the present invention.

On the other hand, the second production method is a production method in which a molybdenum oxide is heated at a temperature of 100 to 800° C. in the absence of a sulfur source to perform crystal growth to first obtain molybdenum oxide having a ribbon-shaped hexahedron (corresponding to a precursor of molybdenum sulfide having a ribbon-shaped hexahedron), and then the ribbon-shaped molybdenum oxide is heated at a temperature of 200 to 1000° C. in the presence of a sulfur source to obtain a ribbon-shaped molybdenum sulfide having a similar shape reflecting the ribbon shape of the molybdenum oxide and having a peculiar and unique shape to the present invention.

In the second production method, it is preferable that the shape of 50 particles of the molybdenum oxide having a ribbon-shaped hexahedron, which corresponds to the precursor of the molybdenum sulfide having a ribbon-shaped hexahedron, is, on average, 500 to 10000 nm in length, 10 to 1000 nm in width, and 3 to 200 nm in thickness, more preferably 1000 to 5000 nm in length, 30 to 500 nm in width, and 3 to 20 nm in thickness, when viewed in a statistically view.

The first production method utilizes a reaction in which sulfurization and crystal shape conversion are carried out simultaneously in parallel, and the number of steps in the second production method can be further reduced, and thus the first production method can be preferably adopted when efficient production is prioritized. The second production method utilizes a sequential reaction in which the crystal shape of the raw material itself is first converted, then sulfurization is carried out, and if necessary, crystal control is carried out, and the shape conversion of the molybdenum oxide can be easily and reliably performed in the raw material stage, and thus the method is preferably adopted when more precise shape control of the molybdenum sulfide is prioritized.

In the reaction between the molybdenum oxide and the sulfur source, the molar ratio of each to be charged may be stoichiometrically determined in accordance with the reaction formula to be adopted as described above. Specifically, in the case where molybdenum trioxide is used as the molybdenum oxide and sulfur is used as the sulfur source, it is preferable that the molar ratio of sulfur to molybdenum trioxide to be charged is in the range of, for example, sulfur/molybdenum trioxide (molar ratio)=2.0 to 15.0. As the excess amount of the sulfur source increases, the charge amount of the sulfur source can further suppress the presence of unreacted molybdenum oxide. The reaction between the molybdenum oxide and the sulfur source can be carried out, for example, by uniformly mixing the two in advance to form a powder and heating the powder in a heat-resistant container at a temperature of 200 to 1000° C. The heating time can be selected, for example, from the range of 2 to 10 hours. Preferably, the reaction is carried out at a temperature of 300 to 600° C. for a heating time of 2 to 7 hours.

The above-described heating can be performed by an arbitrary heating profile. Specifically, for example, the temperature may be raised from a room temperature at a constant rate and maintained at a constant temperature within the above-described heating temperature range for a constant time, or the heating temperature may be changed by stepwise raising and lowering the temperature within the above-described temperature range and maintained at each temperature for a constant time. The heating is preferably performed for a time until the molybdenum sulfide produced does not increase and the produced amount does not change (is saturated).

The proportion of the molybdenum sulfide containing molybdenum disulfide produced by the above-described reaction can be determined by fixing the conditions other than the heating time in the predetermined heating profile to be adopted, sampling the product at every heating time, and quantitatively determining the molybdenum sulfide by a high-frequency inductively coupled plasma (ICP) emission spectral analysis method on the cooled product. Thus, if the relationship between the time and the molybdenum sulfide is grasped, the reaction end point can be determined only by the heating time when the production method of the present invention is industrially carried out.

In the second production method described above, it is preferable to use the molybdenum oxide in which 50 particles in the visual field of a two-dimensional image of a transmission electron microscope photograph have an average primary particle diameter of 5 to 1000 nm, and first heat the molybdenum oxides at a temperature of 100 to 800° C. in the absence of a sulfur source to obtain a molybdenum oxide having a ribbon-shaped hexahedron (first step) because in the second step, which is a subsequent step, a molybdenum sulfide having a ribbon-shaped hexahedron having the same or substantially the same shape as that of the raw material in the preceding step can be selectively obtained.

The heating time in the first step in the second production method described above can be determined by fixing conditions other than the heating time in a predetermined heating profile to be adopted, sampling the product for each heating time, and checking whether or not the molybdenum oxide having a ribbon-shaped hexahedron is obtained in the cooled product by observation with various electron microscopes, photographs, or by X-ray diffraction analysis (XRD). Thus, if the relationship between the time and the molybdenum oxide is grasped as to whether or not the molybdenum oxide having a ribbon-shaped hexahedron, which is the same or substantially the same shape as that of the molybdenum sulfide produced in the second step is obtained, the end point of the crystallization control in the first step can be determined only by the heating time when the production method of the present invention is industrially carried out.

In the second production method, the conditions in the second step can be selected from a temperature range of 200 to 1000° C. and a heating time range of 2 to 10 hours, as in the first production method. Similarly, the reaction end point may be determined. Preferably, the reaction is carried out at a temperature of 300 to 600° C. for a heating time of 2 to 7 hours.

If necessary, the reaction can be carried out with ventilation. Specifically, the reaction can also be carried out while passing an inert gas such as helium or argon, nitrogen, air, or the like into the heat-resistant container.

The heating conditions in the case of obtaining molybdenum sulfide from molybdenum oxide and sulfur may be within the above-described range, but by appropriately selecting the temperature rising rate, it is possible to suppress a larger amount of unreacted molybdenum oxide from remaining due to a low temperature rising rate, sulfur being volatilized out of the system before the reaction, and the reaction with the molybdenum oxide not being sufficiently performed. Further, by covering the heat-resistant container in which the reaction is performed with a lid so as not to be sealed, it is also possible to similarly suppress the volatilization of the sulfur to the outside of the system and to suppress a larger amount of unreacted molybdenum oxide from remaining. These may be adopted in combination.

Thus, the above-described molybdenum sulfide having a ribbon-shaped hexahedron of the present invention can be suitably obtained by the above-described first or second production method.

(Use)

The specific molybdenum sulfide of the present invention can be applied to various known and commonly used applications such as an additive for alloy steel or lubricating oil, a desulfurization catalyst, a decarboxylation catalyst, a semiconductor material, a solar cell material, and a fuel cell material. In particular, a molybdenum sulfide powder having a ribbon-shaped hexahedron and a specific BET specific surface area has a unique property that it has a large number of pores in a surface corresponding to the thickness, and the pores serve as active sites, and thus the catalytic activity is significantly high.

By utilizing such a unique property, the present inventors have found that the molybdenum sulfide is useful as a hydrogen generation catalyst. The molybdenum sulfide of the present invention can be used as a catalyst for electrolyzing water to easily obtain hydrogen gas and oxygen gas. Molybdenum sulfide is safe and clean because it does not generate toxic gases such as hydrogen sulfide gas unless it is in contact with aqua regia (a mixture of hydrochloric acid and nitric acid).

As the hydrogen generation catalyst containing molybdenum sulfide, a molybdenum sulfide powder may be used as it is, or it may be used by being supported on a support. Examples of the support include fullerenes, C60, carbon nanotubes, carbon nanohorns, graphene, graphite carbon, nanodiamond, nanoporous carbon, nanocarbon such as warped nanographene, single metal elements such as Al, Au, Cu, Mo, Ni, Pd, Pt, Ti, and W, alloys such as stainless steel, carbon steels, titanium alloys, and aluminum alloys, nonwoven fabrics, paper, cloth, glass, fibers, resins, metal oxides, metal carbides, metal borides, metal nitrides, and mixtures thereof. These supports may have a medium-dense structure, but are preferably porous supports when higher catalytic activity is required.

The molybdenum sulfide can be supported on the support by using, for example, laser ablation, sputtering, vacuum deposition, film formation, pressing, thinning, plasma treatment, electron beam irradiation, or the like alone or in combination.

(Catalyst Evaluation)

In order to evaluate the catalytic performance of the present invention, light having a wavelength range capable of photoexciting the present invention may be irradiated. The light source may be of any type as long as it generates positive holes and electrons in the photocatalytic material, and artificial light sources such as fluorescent lamps (fluorescent lamps, germicidal lamps, black lights, etc.), discharge lamps (xenon lamps, silver lamps, etc.), filament lamps (incandescent lamps, etc.), light emitting diodes (LEDs), laser light, etc.; and sunlight can be used.

The molybdenum sulfide of the present invention may be used alone, or may be used by being supported on another known and commonly used photocatalyst and used in combination as a promoter. In particular, in order to efficiently decompose water to generate hydrogen, it is necessary to narrow the band gap of the catalyst material and maintain the oxidation-reduction power necessary for decomposing water. From this viewpoint, examples of the photocatalyst to be used in combination include $ZrO_2$, $KTaO_3$, $SrTiO_3$, $TiO_2$, ZnS, CdS, CdSe, GaP, SiC, Si, $WO_3$, and $Fe_2O_3$. The supporting method of the promoter may be appropriately selected from known methods, such as a kneading method, an impregnation method, and a photo-electrodeposition method.

When the molybdenum sulfide of the present invention is used as a hydrogen generation catalyst, the molybdenum sulfide may be used as a powder or as an electrode by a known method. When the molybdenum sulfide of the present invention is used as a powder, the photocatalyst material may be directly dispersed in an aqueous solution and the particles may be irradiated with light. When the molybdenum sulfide of the present invention is used as an electrode, an electrode (photoelectrode) on which a photocatalyst film is formed and a conductor such as a platinum plate as a counter electrode are connected by a conducting wire, and hydrogen may be generated at the counter electrode by irradiating the photoelectrode with light.

The hydrogen generation efficiency may be evaluated by directly quantifying the amount of hydrogen to be generated, or may be evaluated by a current difference during light irradiation. When the amount of hydrogen to be generated is directly determined, the generated hydrogen can be collected and quantified by gas chromatography or the like. In the case of evaluation from current, the amount of reaction can be evaluated from the difference in current flowing between the electrodes when light irradiation is performed and when light irradiation is not performed.

EXAMPLES

Hereinafter, the present invention will be described based on examples.

[Synthesis Example 1] Molybdenum Trioxide M-1

A firing furnace corresponding to a heat-resistant container, a cooling pipe provided with an outside air supply port, and a dust collector for collecting molybdenum oxide were prepared. A mixture of 1 kg of molybdenum trioxide (manufactured by Taiyo Koko Co., Ltd.) and 2 kg of aluminium hydroxide (manufactured by FUJIFILM Wako Pure Chemical Corporation) was charged in a sagger of the firing furnace, and the firing furnace was connected to the cooling pipe and the dust collector. The mixture was heated to 1300° C. in the firing furnace and kept at the temperature for 10 hours to obtain α-alumina, and at the same time, the molybdenum trioxide was vaporized in the firing furnace. Next, a large excess of air relative to the amount of molybdenum trioxide was blown to the molybdenum trioxide vaporized from the exhaust port of the firing furnace through the outside air supply port of the cooling pipe at a cooling rate of 2000° C./sec to rapidly cool the molybdenum trioxide to 200° C. or lower, thereby pulverizing the molybdenum trioxide to obtain 900 g of molybdenum trioxide M-1 in the dust collector.

The BET specific surface area of the molybdenum trioxide M-1 was measured using a Tris3000 model manufactured by Micromeritics Instrument Corporation. As a measurement method, a nitrogen gas adsorption/desorption method in accordance with JIS Z8830 was used. As a result, the specific surface area of the synthesized molybdenum trioxide M-1 was 80 m$^2$/g.

Figure 1:
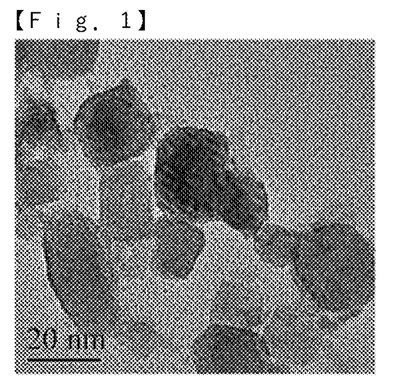
FIG. 1 is a transmission electron microscope photograph of molybdenum trioxide as a raw material obtained in Synthesis Example 1.

The shape and the structure of the molybdenum trioxide M-1 was observed with a transmission electron microscope (TEM). Specifically, the synthesized molybdenum trioxide M-1 was dispersed in an ethanol solution, and the dispersion was placed on a carbon-deposited copper grid to form a sample, and the sample was observed with JEM-2200FS manufactured by JEOL Ltd. As a result, it was found that the average particle diameter of the synthesized molybdenum trioxide M-1 was 10 to 100 nm for 50 particles in the visual field of the TEM photograph. The TEM photograph is shown in FIG. 1.

[Synthesis Example 2] Molybdenum Trioxide M-2

3.0 g of the molybdenum trioxide M-1 of Synthesis Example 1 was put in a crucible, and firing was performed at 400° C. for 10 hours in a firing furnace of ARF-100K type ceramic electric furnace equipped with an AMF-2P type temperature controller (ceramic electric furnace, manufactured by Asahi Rika Factory, Ltd.). After cooling to a room temperature, the crucible was taken out to obtain 2.95 g of molybdenum trioxide M-2.

Figure 2:
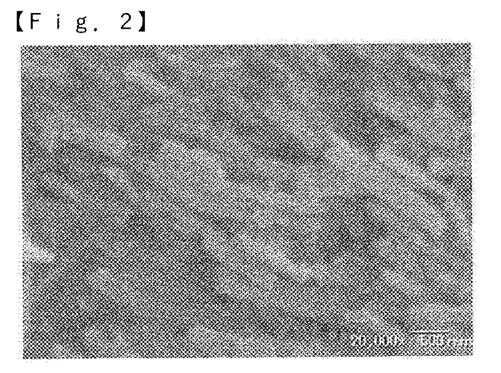
FIG. 2 is a scanning electron microscope photograph of molybdenum trioxide as a raw material obtained in Synthesis Example 2.

The shape and the structure of the molybdenum trioxide M-2 was observed with a scanning electron microscope (SEM). Specifically, the powder was fixed to a sample support with a double-sided tape and observed with a surface observation device VE-9800 manufactured by Keyence Corporation. As a result, it was found that the particles of the molybdenum trioxide M-2 for 50 particles in the visual field of the SEM photograph were ribbon-shaped, and the average size of the ribbon was 2000 nm in length, 300 nm in width, and 5 nm in thickness. The SEM photograph is shown in FIG. 2.

[Example 1] Molybdenum Sulfide S-1

1.00 g (6.94 mmol) of the molybdenum trioxide M-1 prepared in Synthesis Example 1 and 1.56 g (48.6 mmol) of sulfur powder (manufactured by Kanto Chemical Co., Inc.) were put in a magnetic crucible and mixed with a stirring rod so that the powders became uniform. After mixing, a lid was placed on the crucible, and the mixture was put into a high-temperature tubular furnace (TSS type, manufactured by Yamada Denki Co., Ltd.) and fired. The firing conditions were as follows: the temperature was raised at a rate of 5° C./min from a room temperature condition of 25° C., and after reaching 400° C., the temperature was held for 4 hours. During the firing step, nitrogen gas was blown at 0.2 L/min. Thereafter, the temperature in the furnace was lowered by natural cooling to obtain 1.12 g of molybdenum sulfide S-1.

Figure 3:
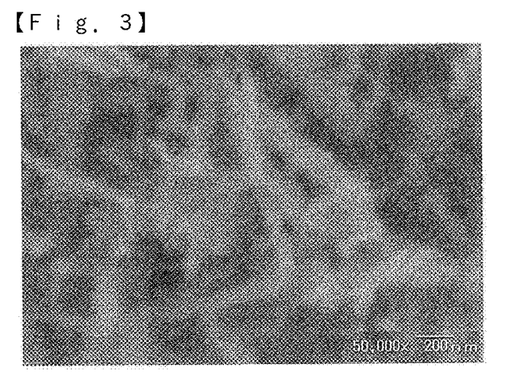
FIG. 3 is a scanning electron microscope photograph of molybdenum disulfide obtained in Example 1.

It was found by the SEM observation that the obtained molybdenum sulfide S-1 powder had a shape of a ribbon of a rectangular plate-shaped body for 50 particles in the visual field of the SEM photograph, and the average size was 1800 nm in length, 70 nm in width, and 5 nm in thickness. The SEM photograph is shown in FIG. 3. Further, X-ray diffraction (XRD) measurement was carried out, and the result was as shown in FIG. 3. From the X-ray diffraction pattern, only diffraction peaks attributable to molybdenum disulfide were observed, and it was confirmed that the phase was a single phase of molybdenum disulfide.

In addition, composition analysis by ICP emission spectral analysis method (emission spectral analysis method using high-frequency inductively coupled plasma as a light source: ICP-AES) showed that S/Mo=2.1 (mol fraction) and a substance close to the theoretical structural formula of molybdenum disulfide ($MoS_2$) was synthesized. It was found to be in the range of MoSx (x=1 to 3). In addition, the specific surface area of the molybdenum sulfide S-1 determined by the nitrogen gas adsorption/desorption BET method in accordance with JIS Z8830 was 42.0 m$^2$/g.

[Example 2] Molybdenum Sulfide S-2

1.12 g of molybdenum sulfide S-2 was obtained in the same manner as in Example 1, except that the molybdenum trioxide used was changed from M-1 to M-2 in the same amount.

Figure 4:
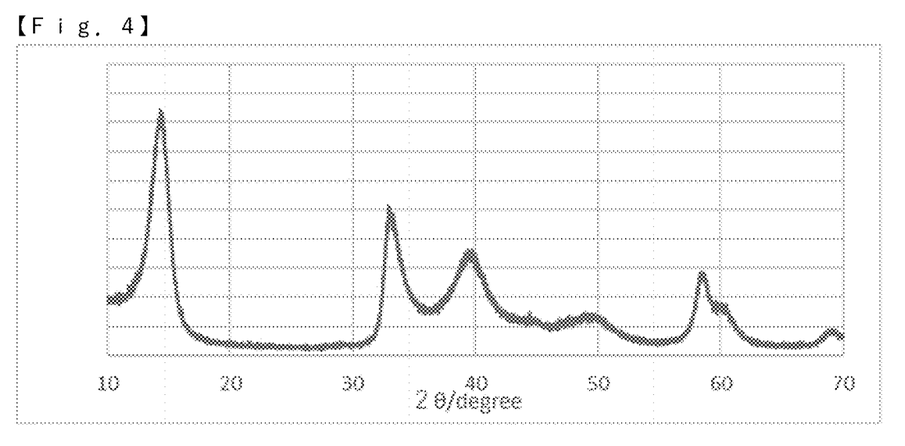
FIG. 4 is an X-ray diffraction pattern of molybdenum disulfide obtained in Example 1.
Figure 5:
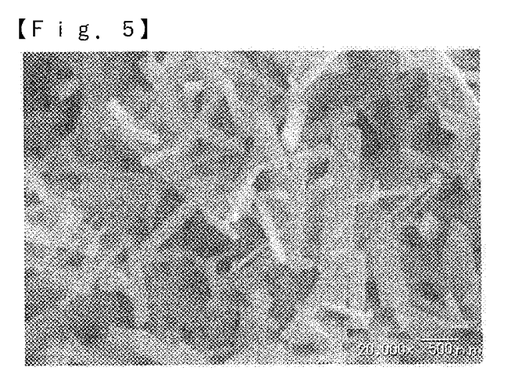
FIG. 5 is a scanning electron microscope photograph of molybdenum disulfide obtained in Example 2.

It was found by the SEM observation that the obtained molybdenum sulfide S-2 powder had a shape of a ribbon of a rectangular plate-shaped body for 50 particles in the visual field of the SEM photograph, and the average size was 2000 nm in length, 120 nm in width, and 6 nm in thickness. The SEM photograph is shown in FIG. 4. Further, when X-ray diffraction (XRD) measurement was performed, only diffraction peaks attributable to molybdenum disulfide were observed, and it was confirmed that the phase was a single phase of molybdenum disulfide.

In addition, composition analysis by ICP emission spectral analysis method showed that S/Mo=2.0 (mol fraction) and a substance close to the theoretical structural formula of molybdenum disulfide ($MoS_2$) was synthesized. It was found to be in the range of MoSx (x=1 to 3). In addition, the specific surface area of the molybdenum sulfide S-2 determined by the nitrogen gas adsorption/desorption BET method in accordance with JIS Z8830 was 29.0 m$^2$/g.

[Example 3] Molybdenum Sulfide S-3

1.13 g of molybdenum sulfide S-3 was obtained in the same manner as in Example 1, except that the amount of the sulfur powder used was changed from 1.56 g (48.6 mmol) to 3.12 g (97.2 mmol).

It was found by the SEM observation that the obtained molybdenum sulfide S-3 powder had a shape of a ribbon of a rectangular plate-shaped body for 50 particles in the visual field of the SEM photograph, and the average size was 1000 nm in length, 90 nm in width, and 5 nm in thickness. Further, when X-ray diffraction (XRD) measurement was performed, only diffraction peaks attributable to molybdenum disulfide were observed, and it was confirmed that the phase was a single phase of molybdenum disulfide.

In addition, composition analysis by ICP emission spectral analysis method showed that S/Mo=2.1 (mol fraction) and a substance close to the theoretical structural formula of molybdenum disulfide ($MoS_2$) was synthesized. It was found to be in the range of MoSx (x=1 to 3). In addition, the specific surface area of the molybdenum sulfide S-3 determined by the nitrogen gas adsorption/desorption BET method in accordance with JIS Z8830 was 61.0 $m^2/g$.

[Example 4] Molybdenum Sulfide S-4

1.14 g of molybdenum sulfide S-4 was obtained in the same manner as in Example 1, except that the temperature rising rate was changed from 5° C./min to 2° C./min.

It was found by the SEM observation that the obtained molybdenum sulfide S-4 powder had a shape of a ribbon of a rectangular plate-shaped body for 50 particles in the visual field of the SEM photograph, and the average size was 1000 nm in length, 110 nm in width, and 5 nm in thickness. Further, when X-ray diffraction (XRD) measurement was performed, only diffraction peaks attributable to molybdenum disulfide were observed, and it was confirmed that the phase was a single phase of molybdenum disulfide. From the composition analysis by ICP emission spectral analysis method, it was found to be in the range of MoSx (x=1 to 3). In addition, the specific surface area of the molybdenum sulfide S-4 determined by the nitrogen gas adsorption/desorption BET method in accordance with JIS Z8830 was 39.3 $m^2/g$.

[Example 5] Molybdenum Sulfide S-5

1.13 g of molybdenum sulfide S-5 was obtained in the same manner as in Example 1 except that the crucible was not covered with a lid.

It was found by the SEM observation that the obtained molybdenum sulfide S-5 powder had a shape of a ribbon of a rectangular plate-shaped body for 50 particles in the visual field of the SEM photograph, and the average size was 1000 nm in length, 90 nm in width, and 5 nm in thickness. Further, when X-ray diffraction (XRD) measurement was performed, only diffraction peaks attributable to molybdenum disulfide were observed, and it was confirmed that the phase was a single phase of molybdenum disulfide. From the composition analysis by ICP emission spectral analysis method, it was found to be in the range of MoSx (x=1 to 3).

[Comparative Example 1] Molybdenum Sulfide S-6

The procedure of Example 1 was repeated except that the molybdenum trioxide used was changed from the molybdenum trioxide M-1 in Example 1 to P-Mo (general-purpose molybdenum trioxide, average particle diameter: 5-10 μm) manufactured by Taiyo Koko Co., Ltd. in the same amount, to obtain 1.13 g of molybdenum sulfide S-6.

Figure 6:
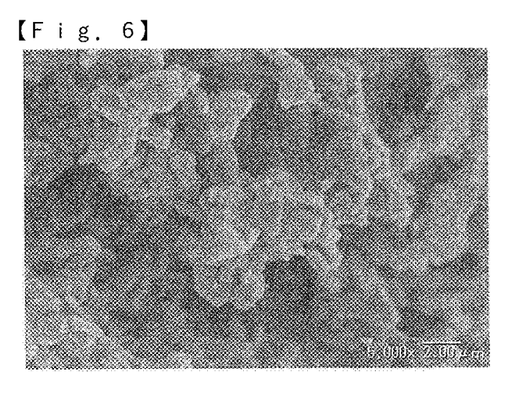
FIG. 6 is a scanning electron microscope photograph of molybdenum disulfide obtained in Comparative Example 1.

It was found by the SEM observation that the obtained molybdenum sulfide S-6 powder did not correspond to a ribbon-shaped molybdenum sulfide having the average size of 500 to 10000 nm in length, 10 to 1000 nm in width, and 3 to 200 nm in thickness, and that the molybdenum sulfide S-6 powder was an aggregate of amorphous particles reflecting the shape of the molybdenum trioxide used for 50 particles in the visual field of the SEM photograph. The SEM photograph is shown in FIG. 6. Further, when X-ray diffraction (XRD) measurement was performed, diffraction peaks of molybdenum dioxide obtained by reduction of molybdenum trioxide as a raw material were strongly observed in addition to diffraction peaks attributable to molybdenum disulfide, and it was confirmed that the sample was a mixture of molybdenum disulfide and molybdenum dioxide.

In addition, it was confirmed from the composition analysis by ICP emission spectral analysis method that S/Mo=0.9 (mol fraction), the sulfur component was smaller than that of the theoretical structural formula ($MoS_2$), and the sulfurization of molybdenum trioxide was insufficient. The specific surface area determined by the BET method was 10.6 $m^2/g$.

[Comparative Example 2] Molybdenum Sulfide S-7

The evaluation was performed in the same manner as in Example 1 except that the molybdenum sulfide to be evaluated was changed to molybdenum sulfide (commercially available reagent) manufactured by Kanto Chemical Co., Inc.

It was found by the SEM observation that the obtained molybdenum sulfide S-7 powder did not correspond to a ribbon-shaped molybdenum sulfide having the average size of 500 to 10000 nm in length, 10 to 1000 nm in width, and 3 to 200 nm in thickness, and that the molybdenum sulfide S-7 powder was in the form of amorphous particles or aggregates thereof having an average particle diameter of several 1000 nm for 50 particles in the visual field of the SEM photograph. Further, when X-ray diffraction (XRD) measurement was performed, diffraction peaks attributable to molybdenum disulfide were observed.

In addition, composition analysis by ICP emission spectral analysis method (emission spectral analysis method using high-frequency inductively coupled plasma as a light source: ICP-AES) showed that S/Mo=2.2 (mol fraction) and the sulfur component was excessive compared to the theoretical structural formula of molybdenum disulfide ($MoS_2$). In addition, the specific surface area of the molybdenum sulfide S-7 determined by the nitrogen gas adsorption/desorption BET method in accordance with JIS Z8830 was 2.56 $m^2/g$.

[Examples 6 and 7 and Comparative Examples 3 and 4] Evaluation of Photocatalytic Performance Using the molybdenum sulfides S-1, S-2, S-6, and S-7 obtained in Examples 1 and 2 and Comparative Examples 1 and 2, respectively, the photocatalytic performance was evaluated. From the hydrogen generation amount in this evaluation, superiority or inferiority of the function as the hydrogen generation catalyst can be determined.

0.3 g of molybdenum sulfide of each of the above Examples and Comparative Examples was suspended in an aqueous mixture of $K_2SO_3$ and $Na_2S$ (0.5M $K_2SO_3$+0.1M $Na_2S$, or 0.25M $K_2SO_3$+0.35M $Na_2S$) as a reducing agent (sacrificial agent) to prepare a reaction solution. Using a 300W xenon lamp (ILC technology; CERMAX LX-300) as a light source, irradiation with visible light having a longer wavelength than 420 nm was performed by a cut-off filter (HOYA L42) to perform a photocatalytic reaction.

The amount of hydrogen generated was determined by a gas chromatograph (Shimazu; GC-8A, MS-5A column, TCD, Ar carrier) manufactured by Shimadzu Corporation connected to the reaction system, and ranked by A, B, C, and D in descending order of the amount of hydrogen generated.

TABLE 1

|  | Example | | Comparative Example | |
| --- | --- | --- | --- | --- |
|  | 6 | 7 | 3 | 4 |
| Molybdenum sulfide | S-1 | S-2 | S-6 | S-7 |
| Hydrogen generation ability | A | B | C | D |

[Example 8 and Comparative Example 5]
Evaluation of Photocatalytic Performance (Part 2)

Using the molybdenum sulfides S-1 and S-7 obtained in Example 1 and Comparative Example 2, respectively, the photocatalytic performance was evaluated according to a known method (J. Am. Chem. Soc. 2016,138,14962). From the hydrogen generation amount in this evaluation, superiority or inferiority of the function as the hydrogen generation catalyst can be determined.

(Synthesis of Molybdenum Sulfide/Cadmium Sulfide Composite)

40 mg of the molybdenum sulfide of Example 1 or Comparative Example 2 and 1.96 mg of cadmium sulfide (CdS, FUJIFILM Wako Pure Chemical Corporation) were ultrasonically dispersed in ethanol. Ethanol was distilled off from the dispersion, and the dispersion was fired at 400° C. for 4 hours in an argon atmosphere to obtain a 2 wt % molybdenum sulfide/cadmium sulfide composite.

(Evaluation of Photocatalytic Performance)

0.2 g of the molybdenum sulfide/cadmium sulfide composite was suspended in 300 ml of an aqueous lactic acid solution (concentration 30 vol %) adjusted to pH=5 to obtain a reaction solution. Using a 300W xenon lamp as a light source, irradiation with visible light having a longer wavelength than 420 nm was performed by a cut-off filter (L42, HOYA) to perform a photocatalytic reaction. The amount of hydrogen generated was determined by a gas chromatograph (GC-8A, Shimadzu Corporation).

TABLE 2

|  | Example 8 | Comparative Example 5 |
| --- | --- | --- |
| Molybdenum sulfide | S-1 | S-7 |
| Hydrogen generation amount (mmol/h) | 2.5 | 0.2 |

From the results shown in Tables 1 and 2, it is clear that the ribbon-shaped molybdenum sulfide, in which 50 particles as measured by observation with a scanning electron microscope (SEM) have a shape of, on average, 500 to 10000 nm in length, 10 to 1000 nm in width, and 3 to 200 nm in thickness; having a specific surface area of 15 to 100 $m^2/g$ by the BET method; and having MoSx (x=1 to 3) by the composition analysis by the ICP emission spectral analysis method, has more excellent hydrogen-generating ability than the known and commonly used molybdenum sulfide which does not correspond thereto.

By combining the synthesis examples and the examples of the present invention, molybdenum oxide generated in the production of alumina can be applied as it is to the production of molybdenum sulfide, and the environmental load due to the release of molybdenum oxide gas into the atmosphere and a part of the equipment for producing alumina and molybdenum sulfide can be shared, and the productivity of alumina and molybdenum sulfide can be improved while suppressing the equipment cost and the equipment installation space.

INDUSTRIAL APPLICABILITY

Since the molybdenum sulfide of the present invention has a unique shape different from conventional ones, it can be applied not only as a highly active hydrogen generation catalyst but also to various known and conventional uses.

The invention claimed is:

1. A ribbon-shaped molybdenum sulfide, wherein 50 particles as measured by observation with a scanning electron microscope (SEM) have a shape of, on average, 500 to 10000 nm in length, 10 to 1000 nm in width, and 3 to 200 nm in thickness;
    and wherein the ribbon-shaped molybdenum sulfide has a specific surface area as measured by the BET method of 25 to 100 $m^2/g$.

2. The ribbon-shaped molybdenum sulfide according to claim 1, which has a specific surface area as measured by the BET method of 35 to 100 $m^2/g$.

3. The ribbon-shaped molybdenum sulfide according to claim 1, wherein the molybdenum sulfide is a molybdenum sulfide represented by MoSx (x=1 to 3) based on measurement by high frequency inductively coupled plasma (ICP) emission spectral analysis method.

4. A hydrogen generation catalyst comprising the molybdenum sulfide according to claim 1.

5. A hydrogen generation catalyst comprising the molybdenum sulfide according to claim 2.

6. A hydrogen generation catalyst comprising the molybdenum sulfide according to claim 3.

* * * * *